(12) United States Patent
Strunk

(10) Patent No.: US 6,242,883 B1
(45) Date of Patent: Jun. 5, 2001

(54) VARIABLE SPEED THREE-PHASE MOTOR DRIVE WITH TWO INVERTER CIRCUITS

(76) Inventor: Timothy L. Strunk, 1864 Fairview Dr., Lexington, KY (US) 40515

( * ) Notice: Subject to any disclaimer, the term of this patent is extended or adjusted under 35 U.S.C. 154(b) by 0 days.

(21) Appl. No.: 09/027,858

(22) Filed: Feb. 23, 1998

Related U.S. Application Data (63) Continuation of application No. 08/419,298, filed on Apr. 10, 1995, which is a continuation-in-part of application No. 08/072,511, filed on Jun. 4, 1993, now Pat. No. 5,406,185.

(51) Int. Cl.[7] .................................................. H02P 1/26
(52) U.S. Cl. ............................................ 318/767; 318/768
(58) Field of Search ........................... 318/624, 767–768, 318/771, 729, 798, 813

(56) References Cited

U.S. PATENT DOCUMENTS

| | | | |
|---|---|---|---|
| 3,582,737 | 6/1971 | Brown | 318/227 |
| 3,764,855 | 10/1973 | Beachley | 317/18 R |
| 3,840,783 | 10/1974 | Eckart | 317/18 D |
| 3,975,668 | 8/1976 | Davie | 318/212 |
| 3,980,939 | 9/1976 | Greer | 318/599 |
| 4,115,727 | 9/1978 | Gross | 318/212 |
| 4,152,640 | 5/1979 | Craig | 324/54 |
| 4,333,046 | 6/1982 | Lee | 323/231 |
| 4,387,329 | 6/1983 | Harlow | 318/729 |
| 4,458,236 | 7/1984 | Perkins | 340/310 R |
| 4,473,817 | 9/1984 | Perkins | 340/310 R |
| 4,695,782 | 9/1987 | Jatnieks | 318/748 |
| 4,723,104 | 2/1988 | Rohatyn | 318/813 |
| 4,777,421 | * 10/1988 | West | 318/768 |
| 4,910,450 | 3/1990 | Parker et al. | 318/811 |
| 5,214,367 | * 5/1993 | Uesugi | 318/803 |
| 5,272,616 | 12/1993 | Divan et al. | 363/49 |
| 5,300,870 | 4/1994 | Smith | 318/768 |
| 5,325,036 | * 6/1994 | Diethert et al. | 318/802 |
| 5,402,053 | 3/1995 | Divan et al. | 318/768 |
| 5,747,833 | * 5/1998 | Fujisaki et al. | 318/808 |
| 6,009,003 | * 12/1999 | Yeo | 363/37 |

FOREIGN PATENT DOCUMENTS

| | | | |
|---|---|---|---|
| 3225422 | 7/1981 | (DE) | 5/14 |
| 0 397 128 | 11/1990 | (EP) | 5/14 |
| 0397128 | * 11/1990 | (EP) | 5/14 |

* cited by examiner

Primary Examiner—Robert E. Nappi
Assistant Examiner—Rina I. Duda
(74) Attorney, Agent, or Firm—King & Schickli PLLC (57) ABSTRACT

An apparatus and method for driving a three-phase motor from an AC energy source includes a converter connected between the energy source and an inverter. The inverter includes two inverter circuits controlled by a logic circuit. The outputs of the inverter circuits have a phase angle therebetween of 60° and are connected directly to two inputs of the motor. The remaining motor input can be connected to either the first or second line of the energy source. Both the frequency and the magnitude of the voltage waveforms can be varied to control the speed of the motor.

8 Claims, 9 Drawing Sheets

VARIABLE SPEED THREE-PHASE MOTOR DRIVE WITH TWO INVERTER CIRCUITS

This application is a continuation of U.S. patent application Ser. No. 08/419,298, filed Apr. 10, 1995 and entitled "Single Inverter Drive for a Three-Phase Motor", which is a continuation-in-part of Ser. No. 08/072,511 filed Jun. 4, 1993, now U.S. patent No. 5,406,185, issued Apr. 11, 1995 and entitled "Two-Phase Inverter Drive for a Three-Phase Motor."

BACKGROUND OF THE INVENTION

This invention relates to inverting or transmitting electrical power to a motor.

DESCRIPTION OF PRIOR ART

EMBODIMENT #1

Figure 1:
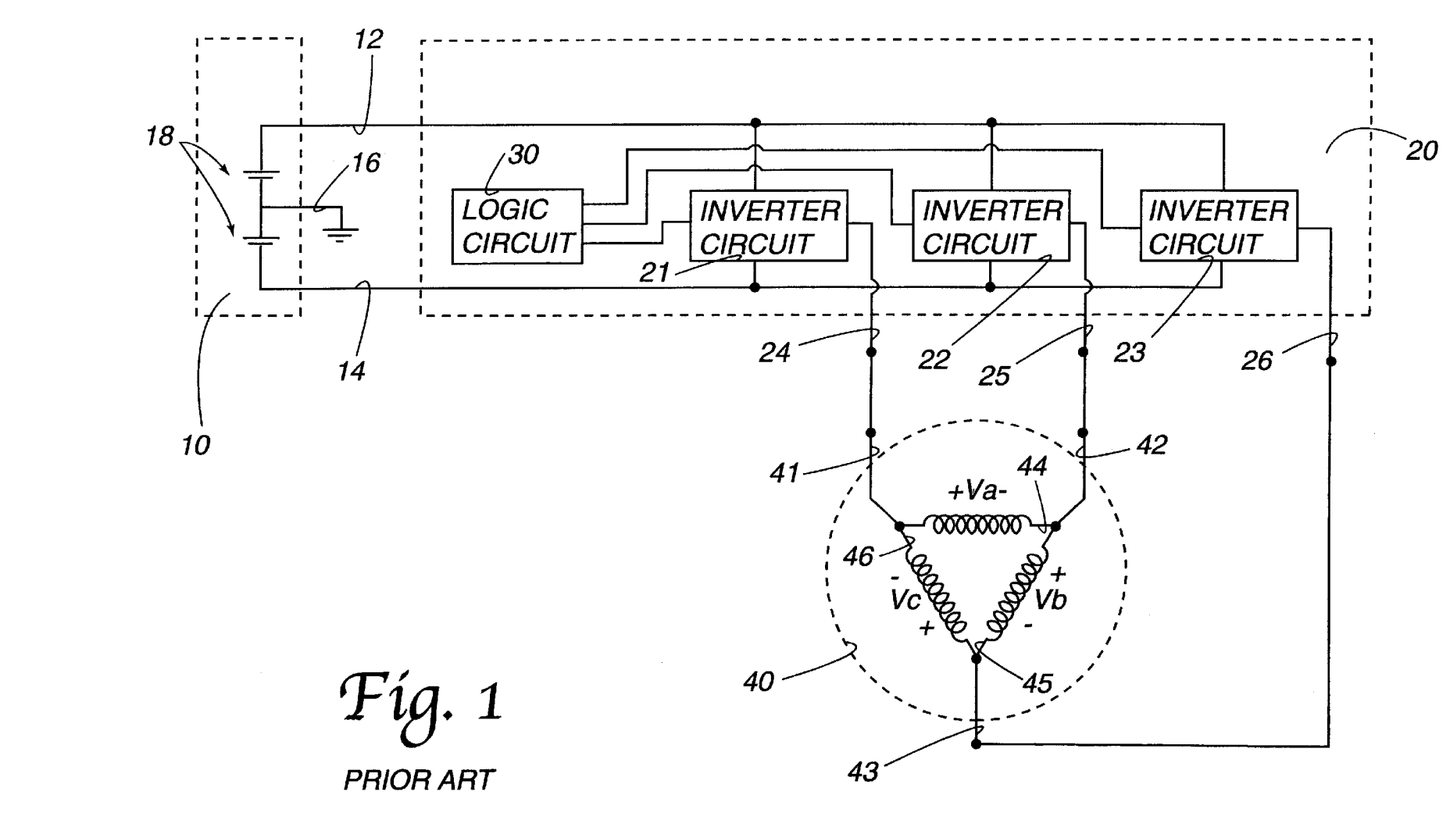
FIG. 1 shows a conventional VVVF three-phase inverter drive where the energy source is DC, with three inverter circuits.

The common and long-standing method to drive a three-phase AC motor is to apply three 120-degree-spaced AC voltages. This common method for a Variable-Voltage-Variable-Frequency (VVVF) drive from a DC energy source is illustrated in FIG. 1 for the case of a system with a battery 10, a three-phase DC-to-AC inverter 20, and a three-phase delta-connected induction motor 40.

The battery 10 is a DC energy source that supplies two output voltages on lines 12 and 14. The output voltage on line 12 is positive X volts and the output voltage on line 14 is negative X volts, where X is a variable that can be any practical value. The battery also has a ground 16 and internal cells 18 that actually produce the voltage potential. The operation of batteries is well defined in the literature and therefore is not discussed in detail here.

The inverter 20 takes the DC voltages on lines 12 and 14 from battery 10 and produces three phases of AC voltage. The three phases are called V1, V2, and V3 and are made available on terminals 24, 25, and 26, respectively. The three phases are produced by the inverter circuits 21, 22, and 23, which are controlled by the logic circuit 30. The voltage waveforms V1, V2, and V3 approximate sine waves with amplitude X and with phase shifts of 30, 150, and 270 degrees, respectively, for forward motor rotation, as detailed in Eqs. 1a through 3a. For reverse motor 40 rotation, the logic circuit 30 changes the sign of the phase angles for V1, V2, and V3 as detailed in Eqs. 1b through 3b. The accuracy to which these waveforms approximate the exact shape of a sine wave depends on the design of the inverter circuits 21, 22, and 23, as well as the logic circuit 30. For the purpose of discussion, we will assume that V1, V2, and V3 each has the exact shape as a sine wave. However, the accuracy of their wave shape is not critical to the present invention.

The following equations describe inverter output voltages for forward rotation, where w is the period of the sine wave in radians and t is the time variable:

$$V1 = X \sin(wt+30) \tag{1a}$$

$$V2 = X \sin(wt+150) \tag{2a}$$

$$V3 = X \sin(wt+270) \tag{3a}$$

The following equations describe inverter output voltages for reverse rotation:

$$V1 = X \sin(wt-30) \tag{1b}$$

$$V2 = X \sin(wt-150) \tag{2b}$$

$$V3 = X \sin(wt-270) \tag{3b}$$

Figure 2:
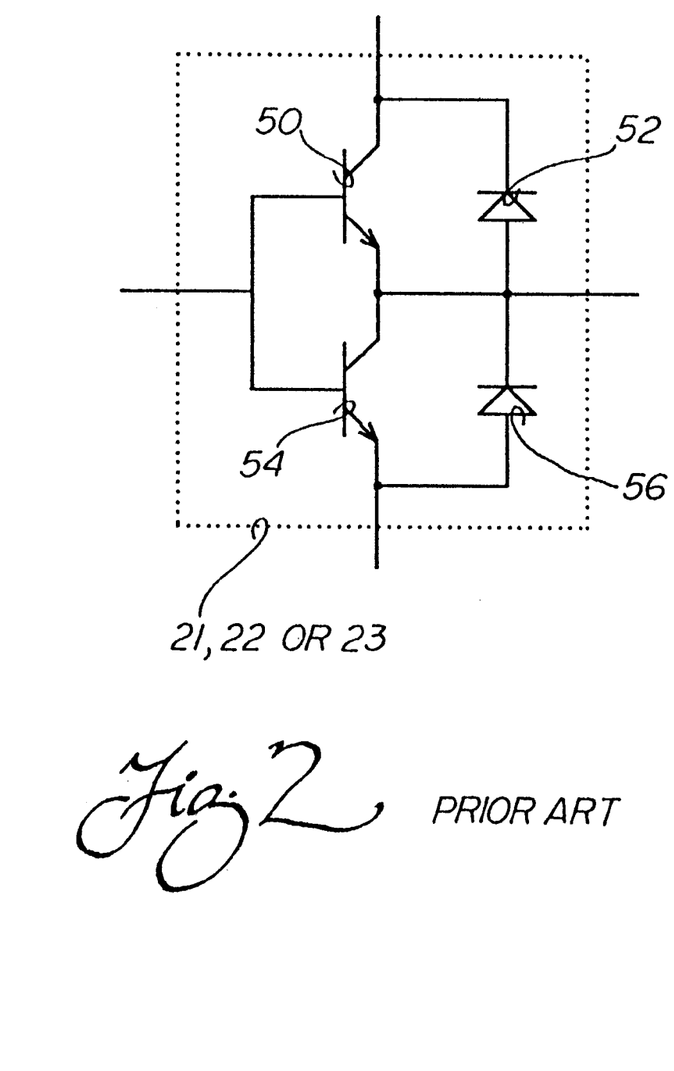
FIG. 2 shows a typical inverter circuit that performs the DC-to-AC inversion for one phase.

The design and operation of the inverter circuits 21, 22, and 23 and of the logic circuit 30 are well documented in the prior art and therefore will not be described in detail here. For reference purposes, a typical inverter circuit is shown in FIG. 2. Its power-conducting elements are transistor Q1 50, transistor Q2 54, diode D1 52, and diode D2 56. A set of silicon-controlled rectifiers (SCRs) could be used instead of the transistors. There are other peripheral circuit components which, for simplicity, are not shown. The logic circuit 30 could be composed of a microprocessor and/or other digital and analog circuit components. It typically produces a pulse-width-modulated (PWM) signal that controls when the transistors Q1 50 and Q2 54 are turned on. It is a simple matter for the logic circuit 30 to control the phase angle of each phase, as described in the prior literature. The design details of the inverter circuits 21, 22, and 23 as well as the design details of the control circuit 30 are not pertinent to the present invention.

The motor 40 produces a useful mechanical torque from the balanced three-phase voltages Va, Vb, and Vc across the stator coils 44, 45, and 46, respectively. The three inverter 20 outputs V1, V2, and V3, on terminals 24, 25, and 26, respectively, are connected to the three motor input terminals 41, 42, and 43, respectively. The voltages on terminals 41, 42, and 43 then cause voltage waveforms Va, Vb, and Vc to be applied to coils 44, 45, and 46, respectively, which make up the stator winding of the motor. Voltage waveforms Va, Vb, and Vc are defined in Eqs. 4a through 6a for forward motor rotation and in Eqs. 4b through 6b for reverse motor rotation. These voltages then cause currents to flow, which in turn produce magnetic flux, which in turn produces torque. The design and operation of an induction motor is well defined in the prior art and thus will not be discussed in detail here. The only critical point for our discussion is to note that, in Eqs. 4, 5, and 6, the voltage waveforms Va, Vb, and Vc are balanced. In other words, they have a 120-degree phase spacing between them and have the same amplitude. This is true for both forward and reverse cases and is a critical requirement for a three-phase motor to work properly.

The following equations describe motor coil voltages for forward rotation:

$$Va = V1-V2 = 1.73X \sin(wt+0) \tag{4a}$$

$$Vb = V2-V3 = 1.73X \sin(wt+120) \tag{5a}$$

$$Vc = V3-V1 = 1.73X \sin(wt+240) \tag{6a}$$

where V1, V2, and V3 are given by Eqs. 1a, 2a, and 3a, respectively.

The following equations describe motor coil voltages for reverse rotation:

$$Va = V1-V2 = 1.73X \sin(wt+0) \tag{4b}$$

$$Vb = V2-V3 = 1.73X \sin(wt-120) \tag{5b}$$

$$Vc = V3-V1 = 1.73X \sin(wt-240) \tag{6b}$$

where V1, V2, and V3 are given by Eqs. 1b, 2b, and 3b, respectively.

DESCRIPTION OF PRIOR ART—EMBODIMENT #2

Figure 3:
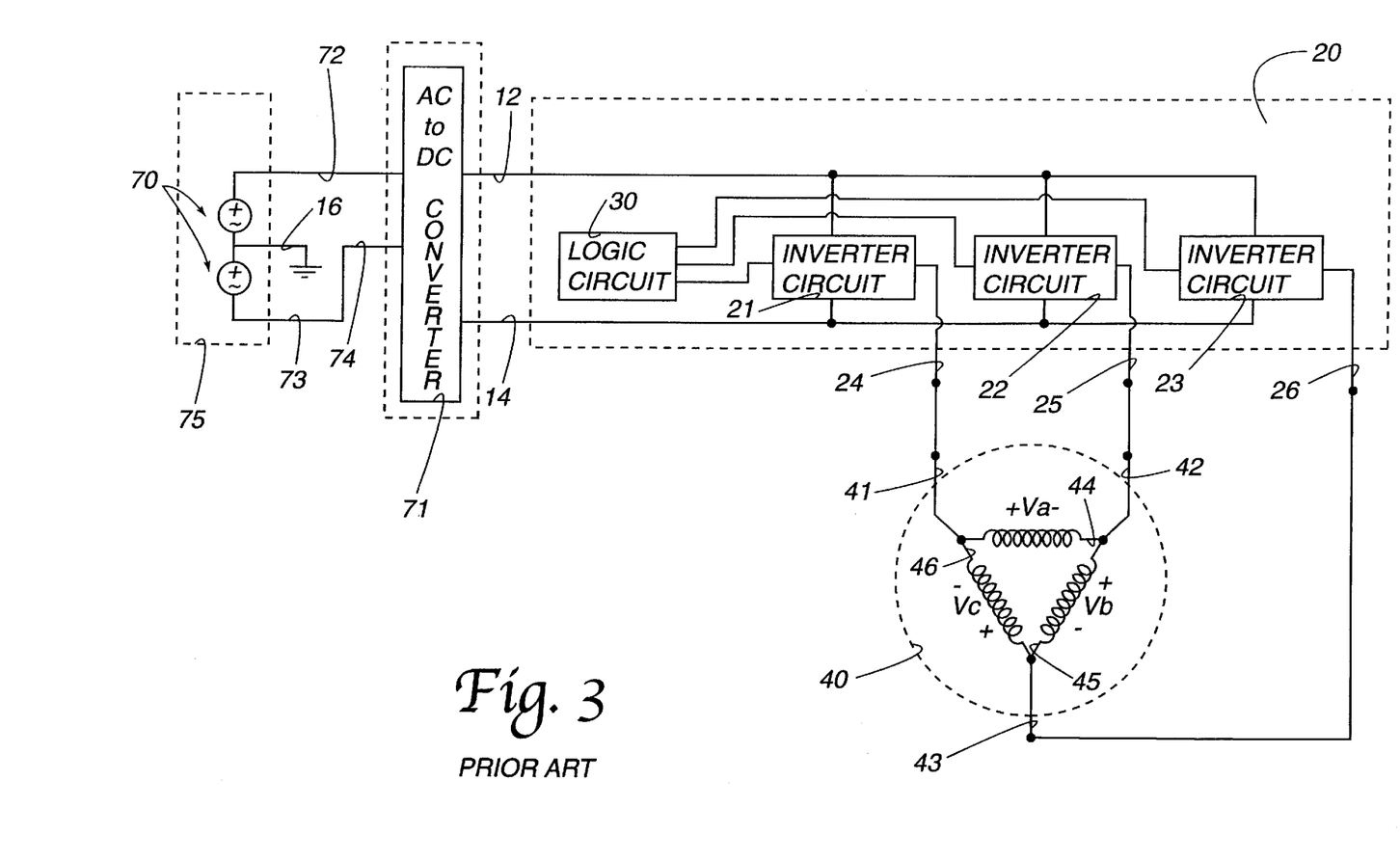
FIG. 3 shows a conventional VVVF three-phase inverter drive where the energy source is AC, with three inverter circuits and a AC to DC converter.

The case of a VVVF drive for a three-phase motor with an single-phase AC energy source is shown in FIG. 3. The system is comprised of an AC energy source 75, a AC-to-DC converter 71, a three-phase inverter 20, and a three-phase delta connected motor 40.

The AC energy source 75 is typical of a 240 volt 60 Hz single-phase source common in residences. Said energy source 75 is composed of two 120 volt 60 Hz AC energy sources 70, supplies an AC voltage between lines 72 and 73, and has a ground 16. The shape of the voltage on line 72 is sinusoidal with respect to the voltage on line 73, with any practical value for magnitude and any practical value for frequency. For illustration purposes, the magnitude of the voltage on line 72 with respect to the voltage on line 73 is x volts.

The AC-to-DC converter 71 produces a positive DC voltage on line 12 and a negative DC voltage on line 14. The input to the converter 71 is the voltage between lines 72 and 73. The input terminal 74 is considered the reference input to the converter 71 since the DC voltage on line 12 is positive with respect to terminal 74 and the DC voltage on line 14 is negative with respect to terminal 74. For reference purposes, a typical AC-to-DC rectification circuit is shown in FIG. 4. The values of capacitor 61, capacitor 62, inductor 64 and inductor 65 will need to be sufficient in order to supply near-constant DC voltages on lines 12 and 14 for three-hundred-sixty degrees so that adequate voltage is available for inverter 20 to produce output voltages V1, V2, and V3. There are many configurations for AC-to-DC converter circuits that are well defined in the literature and the design details of the converter 71 are not pertinent to the present invention and therefore will not be discussed in detail.

The inverter 20 is exactly the same as discussed previously in prior art example #1 so will not be discussed here.

The motor 40 is exactly the same as discussed previously in prior art example #1 so will not be discussed here.

The disadvantage of the common method illustrated for a VVVF drive is that it takes three inverter circuits, which are relatively expensive, to produce the balanced-voltage waveforms across the three stator coils of the motor.

DESCRIPTION OF PRIOR ART—EMBODIMENT #3

Figure 5:
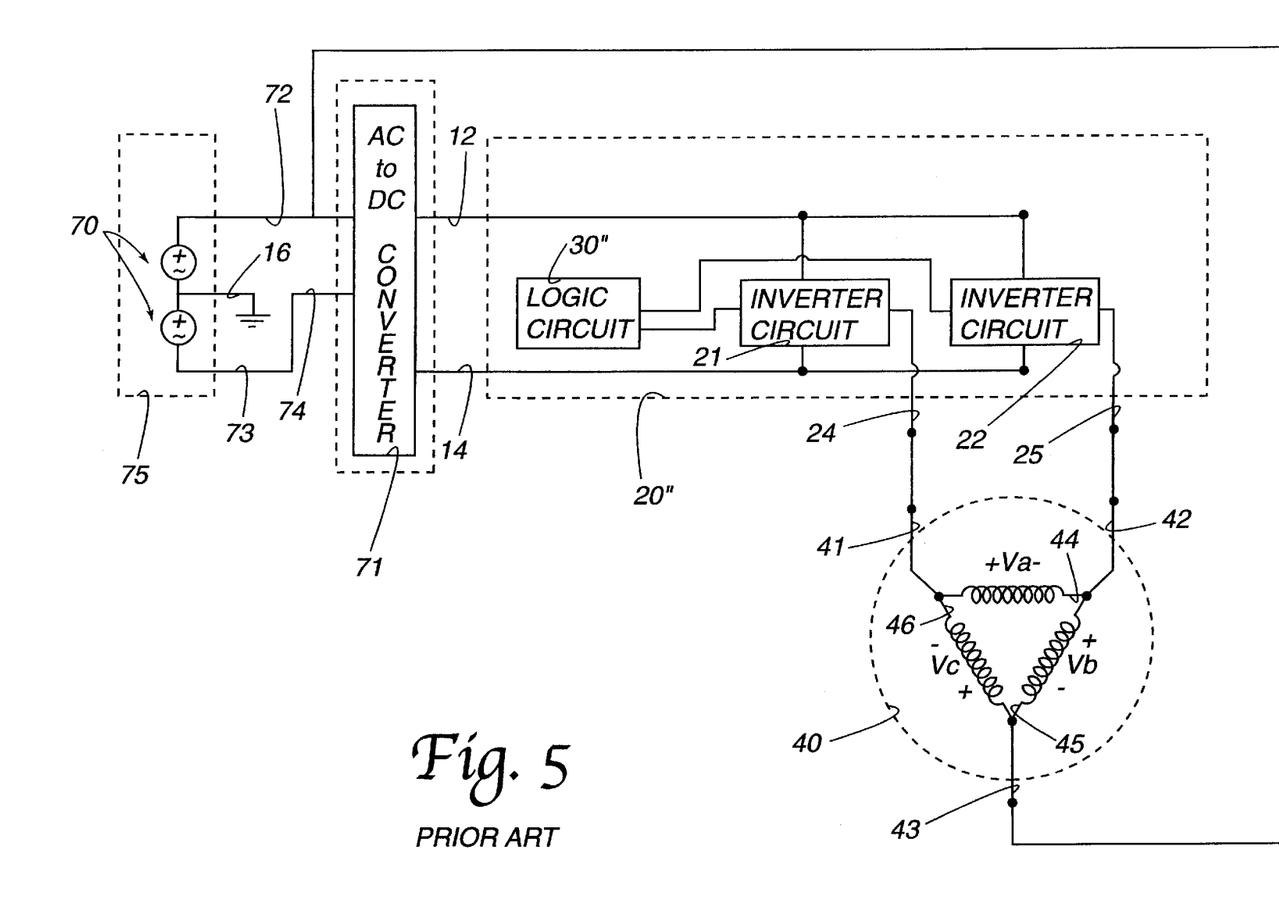
FIG. 5 shows a FVFF two-phase inverter drive for a three-phase motor using conventional techniques.

A method using conventional techniques to implement a Fixed-Voltage-Fixed-Frequency (FVFF) drive for a three-phase motor from a single phase source is illustrated in FIG. 5. A FVFF drive is a lower function drive than a VVVF drive since it can not control the speed of the motor, but is lower cost since only two inverter circuits are required.

The AC energy source 75 and the converter 71 are identical as previously discussed.

The inverter 20" is comprised of inverter circuit 21 and inverter circuit 22 which supply voltage outputs V1 and V2, respectively, to the motor 40 terminals 41 and 42, respectively. The third input to the motor 40, V3 on terminal 43, is supplied directly from the voltage on line 72. The logic circuit 30" controls inverter 21 so that V1 is the same magnitude as V3 and is 120 degrees ahead of V3 for forward rotation. Similarly, logic circuit 30" will control inverter 22 so that V2 is the same magnitude as V3 and is 120 degrees behind of V3 for forward rotation.

The disadvantage of the conventional method illustrated for a FVFF drive for a three-phase motor being powered from a single-phase AC source is that it takes two inverter circuits and requires relatively large values for the capacitors and inductors in the converter circuit.

SUMMARY OF THE INVENTION

Normal operation of a three-phase motor is achieved when the 1st input terminal and the 2nd input terminal have voltages applied to them that are approximately sinusoidal waveforms as measured from the 3rd input terminal and the amplitude and phase angle of the voltage applied to the 2nd input is maintained by some electronic or electrical means at pre-determined values relative to the amplitude and phase-angle of the voltage applied to the 1st input. The amplitude and phase-angle values are determined by the characteristics of the motor's windings. For the common case of a three-phase motor with windings spaced at 120 degrees, equivalent impedances, and equivalent torque constants, the amplitude of the voltage applied to the 2nd input as measured from the 3rd input terminal should be equivalent to the amplitude of the voltage applied to the 1st input as measured from the 3rd input terminal. And the phase angle of the voltage applied to the 2nd input should be 60 degrees from the phase angle of the voltage applied to the 1st input. The 3rd input terminal would be connected to ground in a system with a bipolar DC energy source. The 3rd input would be connected to the neutral terminal of the converter in a system with an AC energy source, a converter, and an inverter. The voltage for the 1st input could be produced by an inverter or taken directly from an AC line. The voltage for the 2nd input will be produced by some electrical or electronic means.

Conventional methods require that both the 2nd and 3rd voltage inputs be controlled relative to the 1st voltage input in order for normal operation of the motor to be achieved. For a common motor with windings spaced at 120 degrees, equivalent impedances, and equivalent torque constants, the conventional method for forward rotation requires that the 2nd voltage input have the same amplitude as the 1st voltage input and have a phase angle that is 120 degrees greater than the phase angle of the 1st voltage input and that the 3rd voltage input have the same amplitude as the 1st voltage input and have a phase angle that is 120 degrees less than the 1st voltage input's phase angle. For reverse rotation, the phase angles of the 2nd voltage input and the 3rd voltage input are switched, but the requirement of having to control both the 2nd and 3rd inputs relative to the 1st is still present.

The novel concept in the disclosed invention is that normal operation of a three-phase motor is achieved when only the 2nd voltage input is controlled relative to the 1st voltage input, when the amplitude of the 1st voltage input and the amplitude of the 2nd voltage input is measured from the 3rd input terminal. Theoretically, the 3rd input terminal can have any constant or any time-varying voltage applied to it. However, in practice the 3rd input will simply be connected to an available ground, neutral, or AC line so that the cost to control the 3rd input is avoided. The connection could be direct so that the 3rd input is always connected to a terminal of the power source, or it could be through an on/off switch which would always be in the on state when the motor is operational.

Accordingly, the reader will see that the two-phase inverter drive does indeed provide for balanced voltages of equal amplitude and phase spacing of 120 degrees across the respective stator coils of a three-phase motor, resulting in normal operation of the motor. Furthermore, the two-phase inverter drive has additional advantages in that:

(1) it is low cost since it only requires two inverter circuits for Variable-Voltage-Variable-Frequency control of a three-phase motor, instead of the three required by a conventional three-phase inverter, (2) it is low cost since it only requires one inverter circuit for a Fixed-Voltage-Fixed-Frequency control of a three-phase motor, instead of the two inverters required by a conventional inverter, (3) it allows the use of passive components to compose a Fixed-Voltage-Fixed-Frequency drive for a three-phase motor from a single-phase AC source, which is not feasible using conventional techniques, and (4) it is low cost since it requires relatively small energy storage components in the AC-to-DC converter for a Variable-Voltage-Fixed-Frequency drive for a three-phase motor from an AC energy source.

BRIEF DESCRIPTION OF THE DRAWING

FIG. 4 shows a typical circuit that performs the AC to DC conversion that is necessary when the energy source is AC.

In all the drawings, the solid lines indicate circuit elements and conductors, and the dashed lines indicate the system components of energy source, converter, inverter, and motor.

DESCRIPTION OF THE PREFERRED EMBODIMENTS

Description of Embodiment #1

Figure 6:
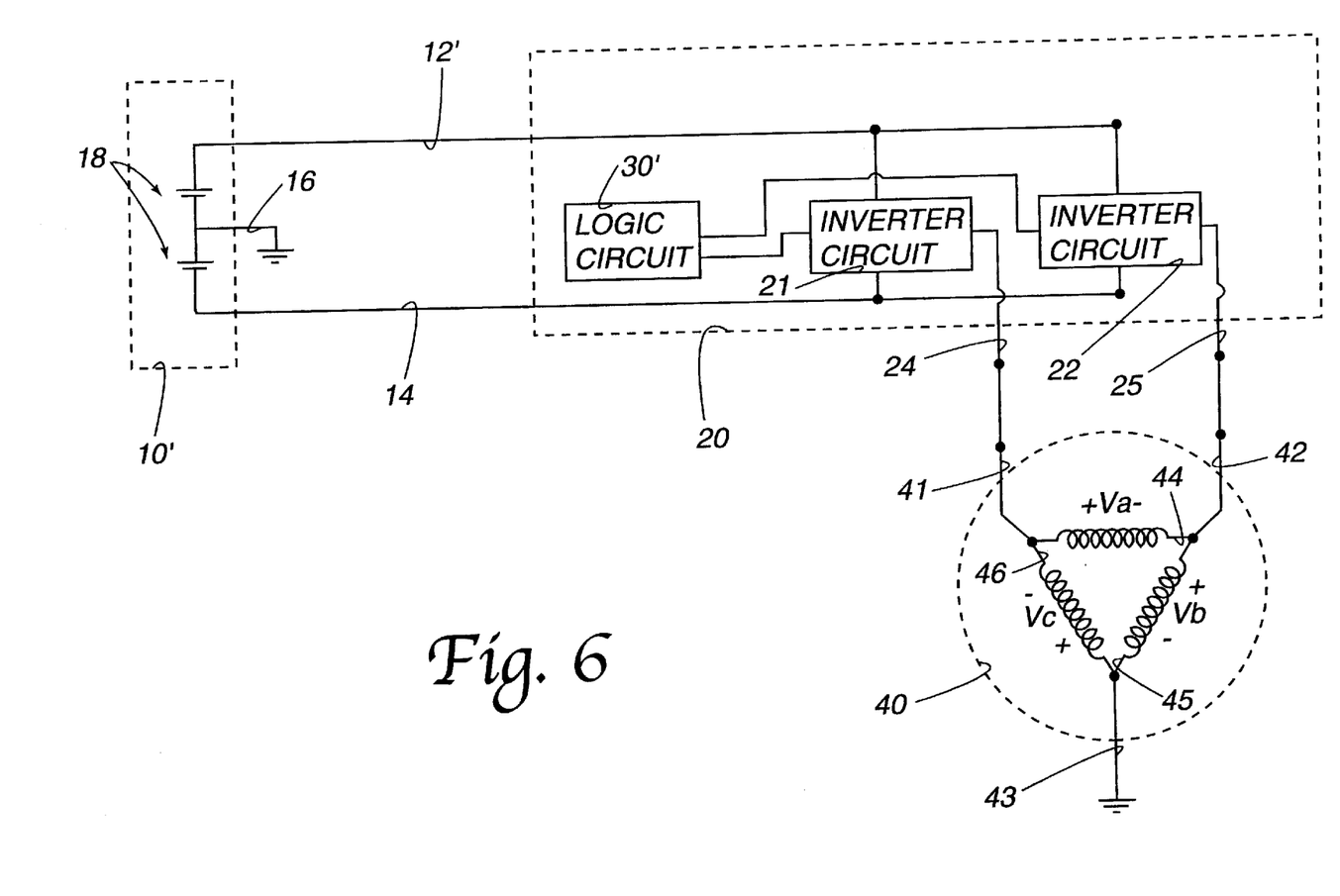
FIG. 6 shows the disclosed VVVF two-phase inverter drive for a three-phase motor, where the energy source is DC.

A first typical embodiment of the closure of the present invention, a two-phase VVVF inverter for a three-phase motor powered from a DC energy source, is illustrated in FIG. 6. The features that are different from the previously discussed, common three-phase VVVF inverter for a three-phase motor are as follows:

(a) There are only two inverter circuits 21 and 22.
(b) The inverter's 20' output names are V1' and V2'.
(c) The battery 10' output voltages on lines 12' and 14' are +1.73X volts and −1.73X volts, respectively.
(d) The phase angle for the second phase is either +60 or −60 degrees relative to the first phase, depending on desired rotation direction.
(e) The third phase is grounded.
(f) The logic circuit 30' controls only two inverter circuits.

The battery 10' is a DC energy source that supplies two output voltages, one each on lines 12' and 14'. The output voltage on line 12' is +1.73X volts and the output voltage on line 14' is −1.73X volts. These voltages were increased by the multiplier factor 1.73 over battery 10 output voltages so that the resulting voltages Va, Vb, and Vc across each of coils 44, 45, and 46 would be identical for either the two-phase inverter 20' or the three-phase inverter 20. The battery also has a ground 16 and internal cells 18' that actually produce the voltage potential.

The inverter 20' takes the DC voltages on lines 12' and 14' from battery 10' and produces two phases of AC voltage, which are called V1' and V2' and which are made available on terminals 24 and 25, respectively. The two phases are produced by the inverter circuits 21 and 22, which are controlled by the logic circuit 30'. The voltage waveforms V1' and V2' approximate sine waves with amplitude 1.73X volts and with phase shifts of 0 and −60 degrees, respectively, for forward motor rotation, as detailed in Eqs. 7a through 8a. For reverse motor 40 rotation, the logic circuit 30' changes the phase angle for V2' as detailed in Eqs. 7b through 8b. The accuracy to which V1' and V2' approximate the exact shape of a sine wave is not critical and depends on the design of the inverter circuits 21 and 22, as well as of the logic circuit 30'. For the purpose of discussion, we will assume that V1' and V2' each has the exact shape as a sine wave.

The following equations describe the two-phase inverter output voltages for forward rotation:

$$V1'=1.73X\ sin(wt+60) \quad (7a)$$

$$V2'=1.73X\ sin(wt+0) \quad (8a)$$

The following equations describe the two-phase inverter output voltages for reverse rotation:

$$V1'=1.73V\ sin(wt-60) \quad (7b)$$

$$V2'=1.73V\ sin(wt+0) \quad (8b)$$

The design and operation of the inverter circuits 21 and 22 and of the logic circuit 30' are well documented in the prior art and thus will not be described in detail here. The typical inverter circuit shown in FIG. 2 is still valid for the two-phase inverter.

The motor 40 produces a useful mechanical torque from the balanced three-phase voltages Va, Vb, and Vc across the stator coils 44, 45, and 46, respectively. The two-phase inverter 20' outputs V1' and V2', on terminals 24 and 25, respectively, are connected to the motor input terminals 41 and 42, respectively. The third motor 40 terminal 43 is simply connected to ground. The voltages on terminals 41, 42, and 43 then cause voltage waveforms Va, Vb, and Vc to be applied to coils 44, 45, and 46, respectively, which make up the stator winding of the motor. Voltages Va, Vb, and Vc are defined in Eqs. 10a, 11a, and 12a for forward motor rotation and in Eqs. 10b, 11b, and 12b for reverse motor rotation. The voltages Va, Vb, and Vc then cause currents to flow, which in turn produce magnetic flux, which in turn produces torque. The design and operation of a three-phase motor is well defined in the prior art and therefore will not be discussed in detail here. The only critical point for our discussion is to note that, in Eqs. 10, 11, and 12, the voltage waveforms Va, Vb, and Vc are balanced. In other words, they have a 120-degree phase spacing between them and have the same amplitude. This is true for both forward and reverse cases and is a critical requirement for a three-phase induction motor to work properly. In fact, a comparison of Va, Vb, and Vc in Eqs. 10, 11, and 12 for the two-phase inverter 20' with their counterparts in Eqs. 4, 5, and 6 for the three-phase inverter 20 reveals that the coil voltages Va, Vb, and Vc are exactly the same!

The two-phase inverter coil equations for forward rotation are:

$$Va = V1' - V2' = 1.73X \sin(wt+0) \quad (10a)$$

$$Vb = V2' - V3' = 1.73X \sin(wt+120) \quad (11a)$$

$$Vc = V3' - V1' = 1.73X \sin(wt+240) \quad (12a)$$

where V1' and V2' are given in Eqs. 7a and 8a, respectively, and V3' is zero. The two-phase inverter coil equations for reverse rotation are:

$$Va = V1' - V2' = 1.73X \sin(wt+0) \quad (10b)$$

$$Vb = V2' - V3' = 1.73X \sin(wt-120) \quad (11b)$$

$$Vc = V3' - V1' = 1.73X \sin(wt-240) \quad (12b)$$

Description of Embodiment #2

Figure 7:
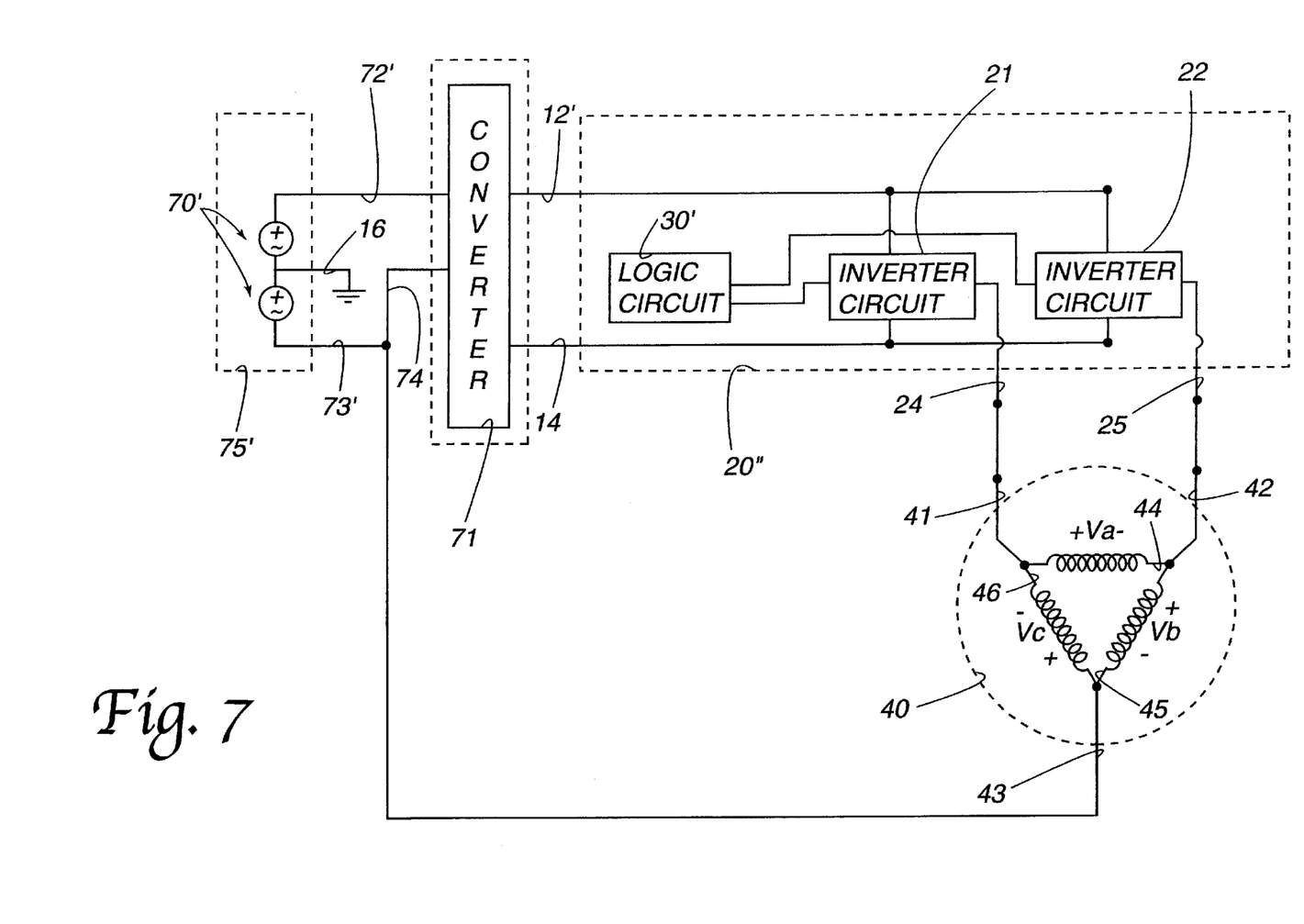
FIG. 7 shows the disclosed VVVF two-phase inverter drive for a three-phase motor, where the energy source is AC, with a AC to DC converter.

A second typical embodiment of the closure of the present invention for a VVVF drive for a three-phase motor from an AC energy source is illustrated in FIG. 7. The features that are different from the previously discussed, common three-phase VVVF drive from an AC energy source shown in FIG. 3 are as follows:

(a) There are only two inverter circuits 21 and 22.
(b) The inverter's 20' output names are V1' and V2'.
(c) The AC energy source's 75' output voltage on line 72' is 1.73x volts with respect to line 73'.
(d) The phase angle for the second phase is either +60 or −60 degrees relative to the first phase, depending on desired rotation direction.
(e) The third phase is connected to the reference input 74 to the converter 71.
(f) The logic circuit 30' controls only two inverter circuits.

The AC energy source 75' supplies a voltage between lines 72' and 73'. Line 73' is connected to the input reference terminal 74 of the converter 71. The magnitude of the voltage on line 72' with respect to line 73' is increased by a factor of 1.73 so that the resulting voltages across the windings will be the same magnitude as in the conventional case to make the comparison easier.

The inverter 20' behaves exactly as previously described. The motor 40 operates as previously described except that the third terminal 43 is simply connected to the reference terminal 74 of the converter 71.

Description of Embodiment #3

A third embodiment of the closure of the present invention is a Variable-Voltage-Fixed-Frequency (VVFF) drive for a three-phase motor driven from a single-phase AC source. This embodiment has the same circuit topology as illustrated in FIG. 7 for a VVVF drive. However, lower cost is achieved by requiring much smaller values for the capacitors and inductors in the converter circuit. This is achieved by the logic circuit controlling V1' and V2' so that they are the same frequency as the voltage on line 72' and are close in phase with the voltage on line 72'. Therefore the majority of the energy comes directly from line 72' and only a minority is stored in the capacitors and inductors for use through out the 360 degree cycle. By contrast, a typical converter has to store the majority of the energy that is available on line 72' during limited portions of the 360 degree cycle for use at other times during the cycle.

Description of Embodiment #4

Figure 8:
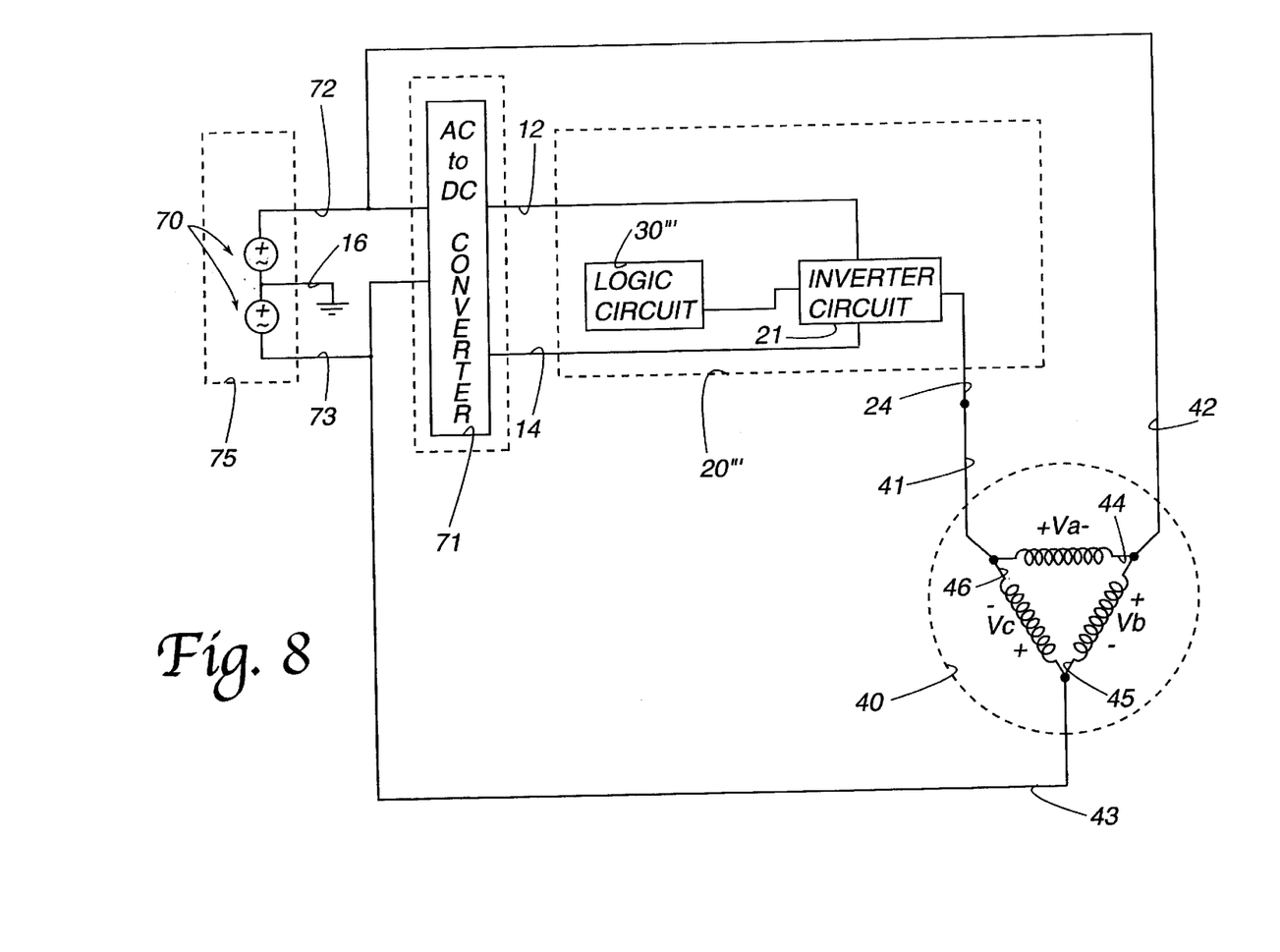
FIG. 8 shows the disclosed FVFF single-phase inverter drive for a three-phase motor, where the energy source is AC, with a AC to DC converter.

A fourth typical embodiment of the closure of the present invention for a FVFF drive for a three-phase motor from an AC energy source is illustrated in FIG. 8. The features that are different from the previously discussed three-phase FVFF drive from an AC energy source shown in FIG. 5 are as follows:

(a) There is only one inverter circuit 21.
(b) The inverter's 20' output name is V1'.
(c) The phase angle for the second phase is either +60 or −60 degrees relative to the first phase, depending on desired rotation direction.
(e) The third phase is connected to the reference input 74 to the converter 20'''.
(f) The logic circuit controls only two inverter circuits.

The AC energy source 75 supplies a voltage between lines 72 and 73. Line 73 is connected to the input reference 74 of the converter 71.

The inverter 20''' behaves exactly as previously described, except that it now only has one output, V1 on terminal 42. The motor 40 operates as previously described except that the third terminal 43 is simply connected to the reference terminal 74 of the converter 71.

Description of Embodiment #5

Figure 9:
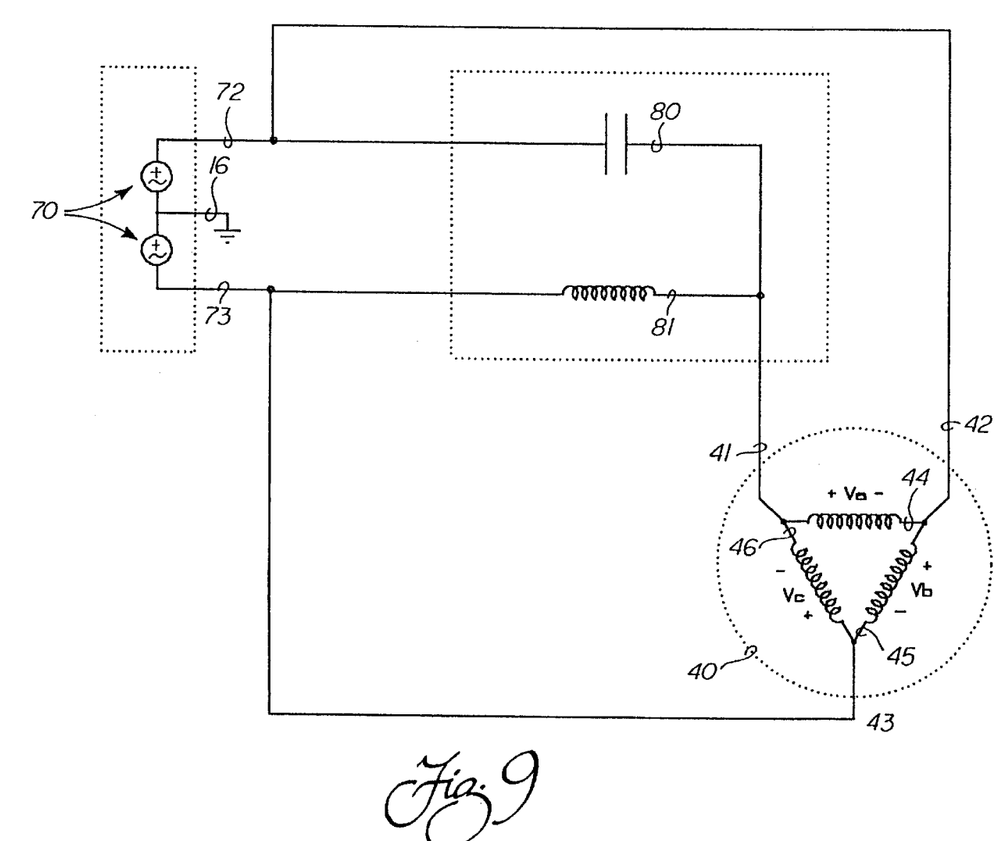
FIG. 9 shows the disclosed FVFF passive drive for a three-phase motor powered from a single-phase AC source.

A fifth embodiment of the closure of the present invention is a Fixed-Voltage-Fixed-Frequency (FVFF) drive for a three-phase motor powered from a single-phase AC energy source and is shown in FIG. 9. Passive circuit elements such as capacitors, inductors, and resistors can be used for this class of drive instead of active circuit elements such as the transistors used in an inverter. The system is comprised of an AC energy source 75, a capacitor 80, an inductor 81, and a three-phase delta connected motor 40.

The AC energy source 75 and the motor 40 have been previously discussed. The capacitor 80 is in series with the AC source 70 and motor terminal 41. The inductor 81 is connected in parallel with motor terminal 41 and motor terminal 43.

The values of capacitor 80 (C) and inductor 81 (L) should be chosen so that Equ. 13 is satisfied so that V2' will be the same magnitude as V1' and phase shifted 60 degrees from it. Z is the motor 40 winding impedance vector and w is the angular velocity of the AC source 75.

$$1.73/Z = (0.5 - j0.866) \times wC + (0.5 + j0.866)/wL \quad (13)$$

Summary of Embodiments

The novel idea of this invention that is revealed in the embodiments shown is that only two active phases are required to drive a three-phase motor if the two active phases have appropriately chosen phase angles and magnitudes. The importance of this idea is that a lower cost drive for a three-phase motor can be achieved. For the case of a VVVF drive, only two inverter circuits are required instead of the conventional three. For the case of a FVFF drive, only one inverter circuit is required instead of the conventional two. And the case of passive components being used to drive a three-phase motor from a single-phase source is now feasible.

That this idea is not obvious is clear, since it allows for a significant cost reduction yet it is neither used in practice nor mentioned in the prior art.

Although the preceding description contains many specificities, these should not be construed as limiting the scope of the invention but as merely providing illustrations of some of the currently preferred embodiments of this invention. For example, the motor being controlled could be a WYE connected three-phase motor or a brushless DC motor. Thus the scope of the invention should be determined by the appended claims and their legal equivalents, rather than by the examples given.

Theory of Operation for Present Invention

It is not obvious that two active phases and a grounded phase applied to a three-phase motor could result in balanced voltages across the motor's stator coils. However, thoughtful consideration of Eqs. 14, 15, and 16 will lead to the conditions that the two active phases must meet in order to accomplish balanced voltages across the three stator coils. Eq. 14 is a general equation that defines the resultant waveform Va when the second active phase V2' is subtracted from the first active phase V1', according to the polarity convention defined for Va in FIG. 6. Eqs. 15 and 16 are general equations that define the waveforms Vb and Vc, respectively. The correctness of Eqs. 14, 15, and 16 can be verified by examining FIG. 6.

The variables in Eq. 14 are PA1, the phase angle for the first phase; PA2, the phase angle for the second phase; PAa, the resulting phase angle for the voltage Va; and Vp, the resulting peak amplitude for Va. The peak amplitudes for V1' and V2' are set to unity (1.0) to simplify the analysis.

$$Va = V1' - V2' \quad (14)$$
$$= \sin(wt + PA1) - \sin(wt + PA2)$$
$$= Vp \sin(wt + PAa)$$

$$Vb = V2' \quad (15)$$
$$= \sin(wt + PA2)$$

$$Vc = -V1' \quad (16)$$
$$= -\sin(wt + PA1)$$
$$= \sin(wt + PA1 + 180)$$

To further simplify the analysis, let PA1 be equal to zero. The four conditions for a two-phase inverter to properly drive a three-phase motor are as follows:

(1) The phase angle of the second phase, PA2, must be 60 degrees from the phase angle of the first phase, PA1. This is true since the sum of 180 degrees and PA1 must be 120 degrees from PA2, as dictated by Eqs. 15 and 16. Thus, in the case where PA1 is zero, 23 PA2 must be either +60 degrees or −60 degrees.

(2) When the second phase, V2', is subtracted from the first phase, V1', the resulting waveform, Va, must have the same amplitude as V1' and V2'. Therefore, Vp in Eq. 14 must be unity since the amplitudes for V1' and V2' are unity.

(3) When the second phase, V2', is subtracted from the first phase, V1', the resulting waveform, Va, must have a phase angle that is 120 degrees from V2'. Therefore, PAa must be 120 degrees from PA2, as dictated by Eqs. 14 and 15.

(4) There must exist two values of PA2 which satisfy the above three conditions and these two values must be of equal magnitude and of opposite sign.

Table 1 lists the resulting values of Vp, PAa, and PA2 minus PAa over the range of possible values for PA2.

TABLE 1

Vp and PA2 − PAa vs PA2, with PA1 = 0

| PA2 (Degrees) | Vp (Degrees) | PAa (Degrees) | PA2 − PAa (Degrees) |
|---|---|---|---|
| 0 | 0 | 0 | 0 |
| 30 | 0.517 | −75 | 105 |
| 60 | 1.000 | −60 | 120 |
| 90 | 1.414 | −45 | 135 |
| 120 | 1.732 | −30 | 150 |
| 150 | 1.932 | −15 | 165 |
| 180 | 2.000 | 0 | 180 |
| −150 | 1.932 | 15 | −165 |
| −120 | 1.732 | 30 | −150 |
| −90 | 1.414 | 45 | −135 |
| −60 | 1.000 | 60 | −120 |
| −30 | 0.517 | 75 | −105 |

Examining Table 1 reveals that the first three conditions are met when PA2 is +60 degrees and when PA2 is −60 degrees! And the fourth condition is met since there are two values of PA2 of opposite sign and equal magnitude that satisfies the first three conditions. Therefore, if the phase angle difference between PA1 and PA2 is +60 degrees, a two-phase inverter can drive a three-phase motor in one direction. And when the difference between PA1 and PA2 is −60 degrees, a two-phase inverter can drive a three-phase motor in the other direction!

To make the comparison between the three-phase inverter and the two-phase inverter easier in the "Description and Operation of Present Invention", PA1 was chosen to be 60 degrees and PA2 to be 0 degrees for the forward rotation case, as shown in Eqs. 7a and 8a. Any other values that are 60 degrees apart could have been used.

What is claimed is:

1. A method of supplying variable-voltage-variable frequency three-phase electrical power from a single-phase power source to a three-phase electric motor by means of an inverter such that the magnitude and frequency of the voltage applied to said motor is any practical value and is not limited to that of said single-phase power source, said motor including three windings operatively connected to three input terminals, comprising the steps of:

connecting a first individual input terminal of said motor to a reference input of said converter; and connecting second and third input terminals of said motor to first and second inverter circuits of said inverter which apply alternating voltage/current waveforms with a predetermined phase angle therebetween of substantially sixty degrees to said second and third input terminals of said motor to provide for variable speed control of said motor.

2. The method of claim 1, wherein said alternating voltage/current waveforms have substantially identical amplitudes.

3. The method of claim 2, wherein said alternating voltage/current waveforms have substantially a sine wave shape.

4. The method of claim 1, wherein said first individual input terminal of said three-phase motor is connected to a second line of said power source.

5. A method of supplying variable-voltage-variable frequency three-phase electrical power from a single-phase power source to a three-phase electric motor by means of an inverter, said motor including three windings operatively connected to three input terminals, comprising the steps of:

connecting a first individual input terminal of said motor to a reference input of said converter;

connecting second and third input terminals of said motor to first and second inverter circuits of said inverter such that a magnitude and frequency of a voltage applied to said motor is not limited to that of said single-phase power source; and applying alternating voltage/current waveforms with a predetermined phase angle therebetween of substantially sixty degrees to said second and third input terminals of said motor to provide for variable speed control of said motor.

6. The method of claim 5, wherein said alternating voltage/current waveforms have substantially identical amplitudes.

7. The method of claim 6, wherein said alternating voltage/current waveforms have substantially a sine wave shape.

8. The method of claim 5, wherein said first individual input terminal of said three-phase motor is connected to a second line of said power source.

* * * * *